United States Patent

Stinnett

[11] Patent Number: 5,538,418
[45] Date of Patent: Jul. 23, 1996

[54] WELDING STRIKER APPARATUS HAVING A DIMPLE

[76] Inventor: Thomas M. Stinnett, 4923 Heathmoore Ct., Louisville, Ky. 40202

[21] Appl. No.: 249,457

[22] Filed: May 26, 1994

[51] Int. Cl.$^6$ ............................................... F23Q 1/02
[52] U.S. Cl. ................................. 431/253; 431/273
[58] Field of Search ................................... 431/273, 274, 431/275, 276, 277, 253; 451/555, 552, 540, 461, 462; 29/78, 80, 76.1

[56] References Cited

U.S. PATENT DOCUMENTS

| 1,401,344 | 12/1921 | Manz | 431/127 |
|---|---|---|---|
| 3,750,348 | 8/1973 | Johnson | 51/391 |
| 4,082,496 | 4/1978 | Johnson | 431/253 X |
| 4,486,169 | 12/1984 | Lewis | 431/253 |
| 4,595,136 | 6/1986 | Cooper | 228/57 |
| 4,646,477 | 3/1987 | Robertson | 451/540 |
| 4,785,586 | 11/1988 | Kratfel | 451/552 |
| 4,898,532 | 2/1990 | Bercik | 431/253 |
| 5,271,730 | 12/1993 | Acacio de Silva | 431/253 |

FOREIGN PATENT DOCUMENTS

| 27163 | of 1903 | United Kingdom | 451/552 |

*Primary Examiner*—Carl D. Price
*Attorney, Agent, or Firm*—Middleton & Reutlinger; James C. Eaves, Jr.; John F. Salazar

[57] ABSTRACT

A welding striker apparatus having a dimple which allows the welder to both clean a welding rod covered in flux and re-strike the rod after cleaning. The apparatus may be attached to the welder via a retractable chain assembly allowing the tool to be attached to the welder's uniform yet out of the way during welding. The dimple is roughened so that the welder may remove the flux from the welding rod. The striker has a replaceable flint which rubs against a roughened striker allowing the welder to re-strike the welding rod after cleaning.

6 Claims, 1 Drawing Sheet

WELDING STRIKER APPARATUS HAVING A DIMPLE

BACKGROUND OF THE INVENTION (a) Field of the Invention

The present invention relates to a welding striker apparatus having a dimple, the apparatus being useful in arc welding to clean a "sugared" welding rod.

(b) Description of the Prior Art

Arc welding uses a pair of electrodes, the workpiece being one and the welding rod being the other. The heat from the electric arc between the electrodes is used melt metal from the rod to be fused into the joint to be welded. The welding rod is usually coated with flux. Particularly in low hydrogen rods, such as those designated as 7018 or 9018 rods, the flux is brittle. When the welding rod breaks, the end "sugars" and it is difficult, if not almost impossible, to re-strike the sugared rod without breaking the flux off. Typically, because of the trouble and low success rate, the welder simply discards a sugared rod, rather than fool with trying to scratch off the sugared portion and re-strike the rod.

U.S. Pat. No. 3,750,348, to Johnson, teaches a welder's glove 2 having a strike-plate surface 26 on the glove back hand portion 6 so that the welder can strike the tip 28 of a welding rod 30 on the strike-plate surface 26 to remove re-fused flux on the rod tip 28.

U.S. Pat. No. 4,595,136, to Cooper, teaches a single combination tool for gas welders including a marking soapstone, a flint-striker igniter, and a holder for torch cleaning wires.

The inventor has seen a stand-alone cube-shaped device, shaped like a chalk for a pool cue tip or a pencil sharpener, which has openings in two opposed sides, the openings being to roughened interior surfaces which can receive a sugared welding rod.

SUMMARY OF THE INVENTION

The present invention is for a welding striker apparatus having a dimple. The dimple is comprised of a cup which is concave on the bottom side and which has a roughened surface suitable for clearing a fused welding rod. Opposite the dimple, in the interior of the cup, is a roughened striker. The striker consists of a unitary bar fixed on one side of the interior portion of the cup and movably attached at the opposite side of the interior of the cup. The bar extends from the point in the cup where it is fixedly attached to an end loop which provides for a spring action force. From the end loop, this movable bar portion extends to the interior portion of the cup opposite the point where the fixed bar portion is fixedly attached. The spring action of the end loop forces the two ends of the bar to opposite sides of the interior cup. A replaceable flint is attached at the end of the movable bar portion in the interior of the cup. A fixed roughened striker extends laterally across the interior portion of the cup, generally from the point of attachment of the fixed end portion of the unitary bar to the flint end portion of the movable bar. The user compresses the movable bar portion to "strike" the flint and provide a means for lighting a welding torch.

This apparatus may be removably attached to an associated retractable chain assembly. The retractable chain assembly may include a clip, a ring, a retractable chain and a retractable chain housing. The end of the chain is removably attached to the ring which is further removably attached to the end loop of the dimpled striker apparatus. The retractable chain housing may have the clip fixedly attached on its exterior portion whereby the user may attach the housing to his clothing keeping the retractable chain and tool close by. Upon use, the welder extends the chain from the chain housing by pulling on the striker apparatus and upon completion of use, may either release the dimpled striker so that the retractable chain assembly retracts the chain into the housing or may more slowly allow the chain to retract.

An object of the invention is to provide a welder's tool which allows the welder to both clean a sugared welding rod and striker a welding torch. It is a further object of this invention to provide a welder's tool which can be removably attached to an article of clothing. A further object of the invention is to provide a tool which may be attached to a retractable chain housing allowing the tool to hang free from the welder's uniform until needed. At such time, the welder may pull outwardly on the tool for use, to clean the welding rod or to strike the welding torch.

Finally, the present invention comprises an apparatus for roughening a sugared welding rod having means for roughening a welding rod. The means for roughening can be detachably connected to means for attaching said apparatus to a welder's uniform. Even further, the roughening means can be incorporated into a dimpled welding rod striker assembly also having means for striking a welding rod.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
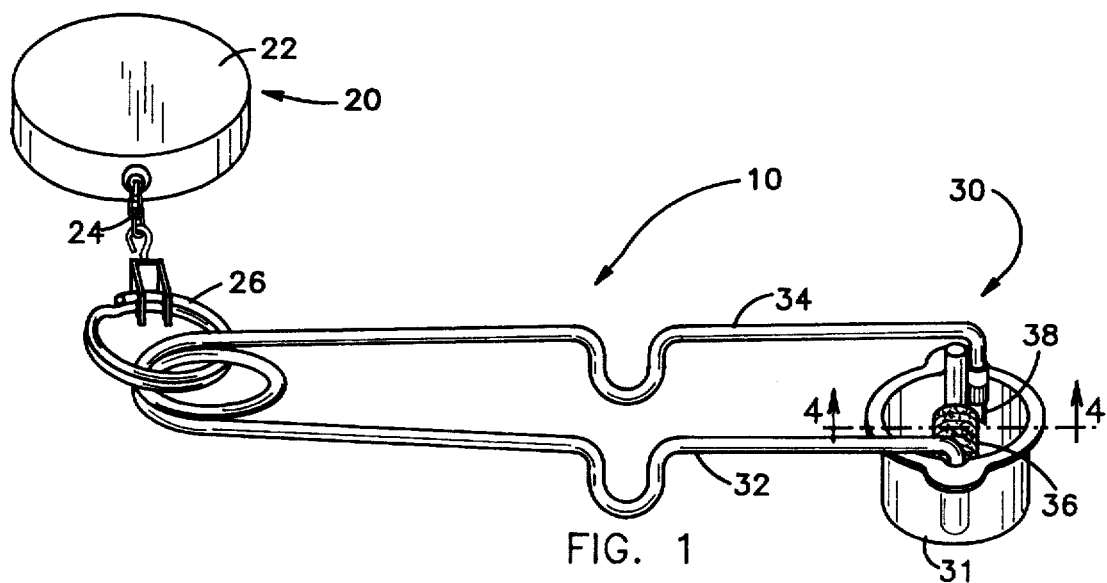
FIG. 1 shows a perspective view of the welding striker apparatus having a dimple with its associated retractable chain assembly of the preferred embodiment.
Figure 2:
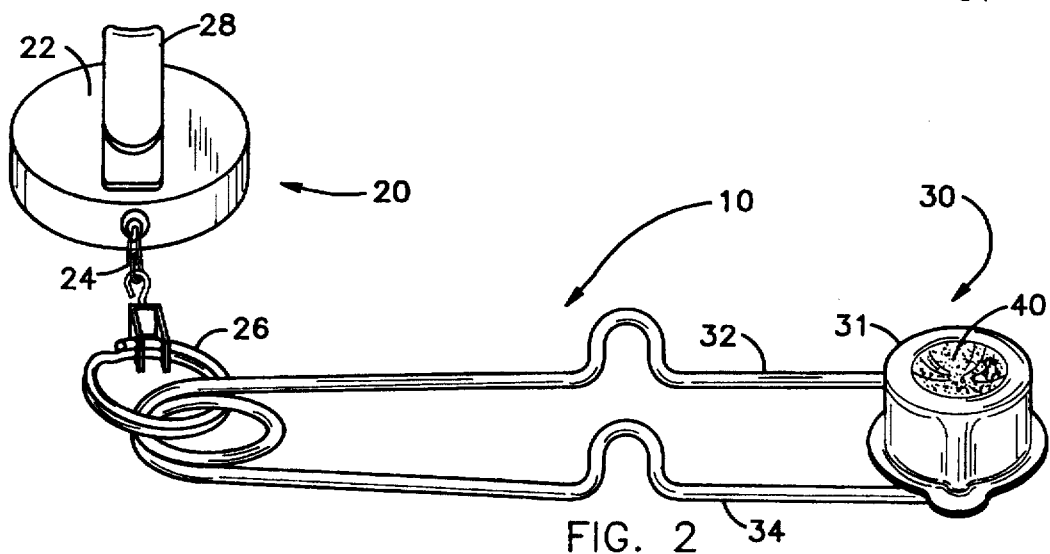
FIG. 2 shows a perspective view of the welding striker apparatus having a dimple with its associated retractable chain assembly of the preferred embodiment of FIG. 1, the striker apparatus and the chain assembly being shown 180 degrees from their positions in FIG. 1.
Figure 3:
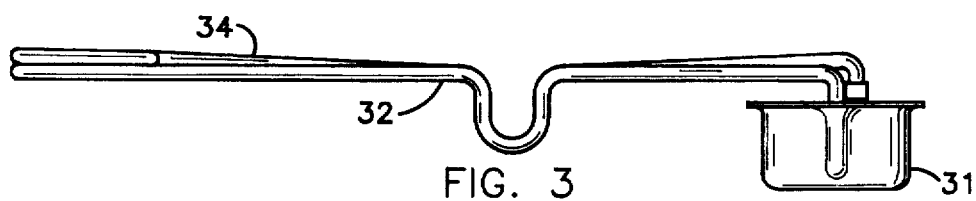
FIG. 3 shows a side view of the welding striker apparatus of the preferred embodiment of FIG. 1; and, FIG. 4 shows a cross-section view of a portion of the welding striker assembly along the lines 4—4 of FIG. 1.
Figure 4:
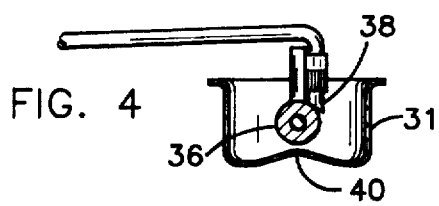

With reference to the figures, the preferred embodiment of the welding striker apparatus 10 is shown. Apparatus 10 includes a dimpled striker assembly 30 and can include an associated retractable chain assembly 20.

The retractable chain assembly 20 serves as a means for attaching the striker apparatus to a welder's uniform, for example, including a retractable chain housing 22, a retractable chain 24, a ring 26, and a clip 28. The dimpled striker assembly 30 is removably retained by ring 26. Assembly 20 permits the welder to place the clip 28 onto the welder's belt, with the chain 24 normally retracted into housing 22. When the welder wants to use the dimpled striker assembly 30, the welder grabs the striker assembly 30 and pulls outwardly on it, as permitted by chain 24. After use of the striker assembly 30, the welder allows the chain 24 to retract into housing 22.

The dimpled striker assembly 30 of the preferred embodiment serves both as a means for roughening a sugared welding rod and a means for striking a welding rod. While shown as a combined assembly, these functions could be accomplished by having separate roughening means and striking means. If separate roughening means and striking means were employed, they could both be removably retained by retractable chain assembly 20.

Dimpled striker assembly 30 is shown having a cup 31 at its striker end. A unitary bar is fixedly attached to cup 31, the bar having a fixed bar portion 32; an end loop retainable by retractable chain assembly 20, the end loop opposite the striker end; and a movable bar portion 34. The cup 31 has a roughened striker 36 contained therein. At the striker end, movable bar portion 34 has a replaceable flint 38 attached thereto. Flint 38 can contact roughened striker 36. The welder squeezes movable bar portion 34 toward fixed bar portion 32, as permitted by a spring action of the end loop, to cause flint 38 to rub along roughened striker 36 and produce sparks.

Cup 31 has a bottom cup surface which contains a dimple 40 therein. Dimple 40 pushes the bottom of cup 31 upward toward the roughened striker 36. The surface of the dimple 40 is roughened to a desired roughness. The roughened surface 40 provides a means for the welder to clean a used welding rod. Welding rods, in use, become covered in re-fused material causing the rod to be "sugared" and inefficient in use. This fused material interferes with the proper burning characteristics of the welding rod and must be cleaned frequently. The roughened dimple 40 of this invention provides such a means. The welder simply pulls this tool away from the retractable chain assembly, inserts the fused welding rod into the dimple and rubs the surface of the rod clear utilizing the roughened surface of the dimple. Upon completion of cleaning the sugared welding rod, the welder permits the tool to automatically retract towards to retractable chain assembly 20. The chain retracts into the retractable chain housing 22 thereby keeping the tool out of the way but close at hand for future use. The retractable chain assembly thus may also include a means for attaching the retractable chain housing to a welder's uniform for easy accessibility.

In use, a welder attaches retractable chain assembly 20 to his uniform via clip 28. This allows the dimpled striker tool to hang from the welder's uniform until needed. The chain 24 of the retractable chain assembly is fully retracted into the chain housing thereby keeping the dimpled welding striker apparatus close at hand while out of the way. The ring 26 at the of chain 24 allows the tool to be removably attached to retractable chain assembly 20. The welder may grasp the dimpled striker apparatus by wrapping a hand around fixed bar 34 and movable bar 32, pulling outwardly and extending chain 24. Dimpled roughened surface 40 may be used to clear re-fused material collecting upon the welding rod. After cleaning a sugared rod, the welder turns the apparatus 10 over and, to strike the welding torch, the welder squeezes movable bar 34 towards fixed bar 32, placing the end of the welding torch close to roughened striker 36 in cup 31. In squeezing movable bar 32 towards fixed bar 34, replaceable flint 38 rubs against roughened striker 36 producing sparks sufficient to ignite the torch. Flint 38 may be removed and replaced after a period of use. The end loop portion of the unitary bar opposite the dimpled striker assembly 30 provides a spring force wherein there is resistance to compressing movable bar 32 towards fixed bar 34.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A welding striker apparatus, comprising: means for striking a welding rod, said striking means including a cup, said cup having a roughened striker therein, said striking means including a bar fixedly attached to said cup at a first bar end, said bar having a second bar end having a flint thereon, said second bar end being movable to rub said flint across said roughened striker; said cup having an exterior surface, said exterior surface including means for roughening a sugared welding rod.

2. The apparatus of claim 1, where said cup has a dimpled bottom face, said face being concave and having a roughened surface thereon, said roughened surface providing said roughening means.

3. The apparatus of claim 1, where said bar has a fixed bar portion, an end loop portion, and a movable bar portion, said fixed bar portion fixedly attached to said cup at said first bar end, said end loop portion at a location opposite said cup.

4. The apparatus of claim 3, where said end loop portion of said bar exerts a pressure on said movable bar portion so that said flint and said fixed bar portion are in a diametrically opposed relationship within said cup.

5. The apparatus of claim 1 further comprising: means for attaching said welding striker apparatus to a welder's uniform.

6. A welding striker apparatus, comprising:
  (a) a retractable chain assembly including a retractable chain housing, said housing having a retractable chain, a ring removably attached to an end of said retractable chain and a clip attached to an exterior surface of said housing;
  (b) a cup including a dimpled face on a bottom exterior portion of said cup, said dimpled face being concave and having a roughened surface thereon, said cup having an interior portion located on a side opposite said roughened surface, said interior portion containing a roughened striker, said roughened striker fixedly attached within said cup and extending laterally from a first interior side of said cup to a second opposed interior side of said cup;
  (c) a unitary bar, said unitary bar having a fixed bar portion, an end loop portion and a movable bar portion, said fixed bar portion fixedly attached to the interior of said cup at said first interior side, said fixed bar portion extending from said cup to said end loop portion, said end loop portion being removably attachable to said ring of said retractable chain assembly, said end loop portion providing a spring force between said fixed bar portion and said movable bar portion, said movable bar portion extending from said end loop portion to the interior portion of said cup at said second opposed interior side of said cup, said movable bar portion having a cup end having a replaceable flint attached thereto, said flint being frictionally movable across said roughened striker by a welder compressing the fixed bar portion and movable bar portion, thereby causing said removable flint to rub across said roughened striker.

* * * * *